US011280636B2

(12) United States Patent
Zwijze et al.

(10) Patent No.: US 11,280,636 B2
(45) Date of Patent: Mar. 22, 2022

(54) ROTARY POSITION SENSOR AND METHOD OF MANUFACTURING THE SAME

(71) Applicant: Sensata Technologies, Inc., Attleboro, MA (US)

(72) Inventors: Albert Ferdinand Zwijze, Vriezenveen (NL); Paulus Thomas Johannes Gennissen, Enschede (NL); Sietse Abel Michiel Hendriks, Enschede (NL)

(73) Assignee: Sensata Technologies, Inc., Attleboro, MA (US)

( * ) Notice: Subject to any disclaimer, the term of this patent is extended or adjusted under 35 U.S.C. 154(b) by 157 days.

(21) Appl. No.: 16/030,168

(22) Filed: Jul. 9, 2018

(65) Prior Publication Data

US 2020/0011705 A1  Jan. 9, 2020

(51) Int. Cl.
*G01B 7/30*     (2006.01)
*G01D 5/14*     (2006.01)

(52) U.S. Cl.
CPC .................................... *G01D 5/145* (2013.01)

(58) Field of Classification Search
CPC ........ G01D 5/142; G01D 5/145; G01D 5/147; G01B 7/30
See application file for complete search history.

(56) References Cited

U.S. PATENT DOCUMENTS

| | | | | |
|---|---|---|---|---|
| 2007/0103149 A1* | 5/2007 | Horie | ...................... | G05G 1/38 324/207.25 |
| 2009/0009159 A1 | 1/2009 | Patil et al. | | |
| 2009/0079423 A1 | 3/2009 | Steinich et al. | | |
| 2013/0285649 A1* | 10/2013 | van der Kuij | ......... | G01D 5/147 324/207.13 |
| 2015/0253803 A1* | 9/2015 | Weschke | .................. | G05G 1/44 74/514 |
| 2016/0146633 A1* | 5/2016 | Ueno | ...................... | G01D 5/145 324/207.25 |
| 2016/0169705 A1* | 6/2016 | Yamashita | ............. | G01D 5/145 324/207.25 |
| 2018/0135960 A1* | 5/2018 | Mellinger | .............. | G01D 11/30 |

FOREIGN PATENT DOCUMENTS

GB        2552478        1/2018

OTHER PUBLICATIONS

European Search Report for European Patent Application No. 19183564.4, dated Dec. 10, 2019, 9 pages.

* cited by examiner

*Primary Examiner* — Patrick Assouad
*Assistant Examiner* — Taqi R Nasir
(74) *Attorney, Agent, or Firm* — Mark H. Whittenberger, Esq.; Holland and Knight LLP (57) ABSTRACT

A rotary position sensor is disclosed. The sensor comprises a first structure and a second structure. The first structure is rotatably coupled to the second structure by means of a bearing having a rotation axis. A dipole magnet is attached to the first structure with a direction of magnetic moment perpendicular to the rotation axis and a sensing unit is attached to the second structure and configured to measure the absolute position of the dipole magnet's rotation angle. The first structure comprises an alignment characteristic which is detectable on the outside of the rotary position sensor. The dipole magnet is attached to the first structure such that the alignment characteristic and direction of the magnetic moment of the dipole magnet have a defined angle of rotation relation on the first structure.

17 Claims, 6 Drawing Sheets

ROTARY POSITION SENSOR AND METHOD OF MANUFACTURING THE SAME

TECHNICAL FIELD

The subject disclosure relates to a rotary position sensor. The subject disclosure further relates to a method of manufacturing the rotary position sensor.

BACKGROUND ART

The height of the chassis of a truck or trailer is regulated by an Electronic Level Control (ELC) system. The ELC system comprises an angle sensor which is connected by means of two linkage bars to a wheel axle. The angle sensor is attached to the chassis of the vehicle. An end of a mainly vertical positioned linkage bar is coupled to the wheel axle. An end of a mainly horizontal positioned linkage bar is coupled to a rotation axis of the angle sensor. The other ends of the two linkage bars are coupled together by means of a hinge structure. When the wheel axis moves up/down relative to the chassis, this movement results in rotation of the rotation axis of the angle sensor. The angle sensor measures the angle of the rotation axis. The measured angle is indicative of the height of the vehicle. The measured height of the vehicle enables the ELC system to regulate the height of the vehicle. The ELC system also includes axle lifting functions for trucks/trailers/buses with pneumatic suspension. Examples of axle lifting functions are: 1) kneeling function of buses to enable children, the elderly and the handicapped to get in and out of the vehicle more easily; and 2) lowering the height of trucks/trailers on smooth roads to reduce fuel consumption.

A sensing IC to measure the rotation angle can be the AMS AS5048 Magnetic Rotary Position sensor integrated circuit (AS5048 IC) available from AMS USA Inc. of Curpertino, Calif. The AS5048 IC is an easy to use 360° angle position sensor. The AS5048 IC measures the absolute position of the magnet's rotation angle and consists of Hall sensors with magnets, an analog to digital converter and digital signal processing. The zero position can be programmed. This simplifies the assembly of a complete system because the zero position of the magnet does not need to be mechanically aligned. The sensing AS5048 IC tolerates misalignment, air gap variations, temperature variations as well external magnetic fields. Another sensing integrated circuit (IC) with similar functionality that can be used is the MLX90365 Triaxis Position Sensor IC available from Melexis Inc. of Nashua, N.H.

The programming capabilities of the sensing IC's help developers to adapt the parameters in the IC such that the output signal of the sensing IC has the required output characteristics with respect to output value and transfer curve. The angle sensor in an ELC system only has to measure an angle in a limited range smaller than 360°. By using above identified sensing ICs, the angle sensor is able to measure an angle over the full 360° range and could be used as a rotary position sensor. Known rotary position sensors comprise a rotatable part and a fixed part. The rotatable part is rotatably coupled to the fixed part by means of a bearing having a rotation axis. A dipole magnet is attached to the rotatable part with a direction of magnetic moment perpendicular to the rotation axis. A sensing unit is attached to the fixed part and configured to measure the absolute position of the dipole magnet's rotation angle.

SUMMARY OF INVENTION

It is an object of the present technology to provide a rotary position sensor which is relatively easy to manufacture and has advantages over the known rotary position sensors such as: improved product lifetime; improved output accuracy over the product life; the robustness to withstand high fatigue strength requirements; and high magnetic immunity.

According to a first aspect of the subject technology, this object is achieved by the rotary position sensor having: a first structure and a second structure, the first structure being rotatably coupled to the second structure by means of a bearing having a rotation axis; a dipole magnet attached to the first structure with a direction of magnetic moment perpendicular to the rotation axis; and a sensing unit attached to the second structure and configured to measure the absolute position of the dipole magnet's rotation angle, wherein the first structure comprises an alignment characteristic which is detectable on an outside of the rotary position sensor, wherein the dipole magnet is attached to the first structure such that the alignment characteristic and direction of the magnetic moment of the dipole magnet have a defined angle of rotation relation on the first structure.

Advantageous embodiments and further ways of carrying out the present technology may be attained by the measures mentioned in the dependent claims.

The present technology is based on the insight that when the rotation axis of the di-pole magnet is aligned with the centre of a sensing-IC measuring the direction of magnetic moment of the dipole magnet, angular mounting variations when mounting the di-pole magnet on a rotating shaft could easily calibrated by programming the corresponding parameters of the sensing-IC. However, when the rotation axis of the di-pole magnet is not-aligned with the centre of the sensing-IC, there will be an error in the measured rotation angle due to eccentricity of the rotation axis of the di-pole magnet and centre of the sensing-IC.

Figure 3:
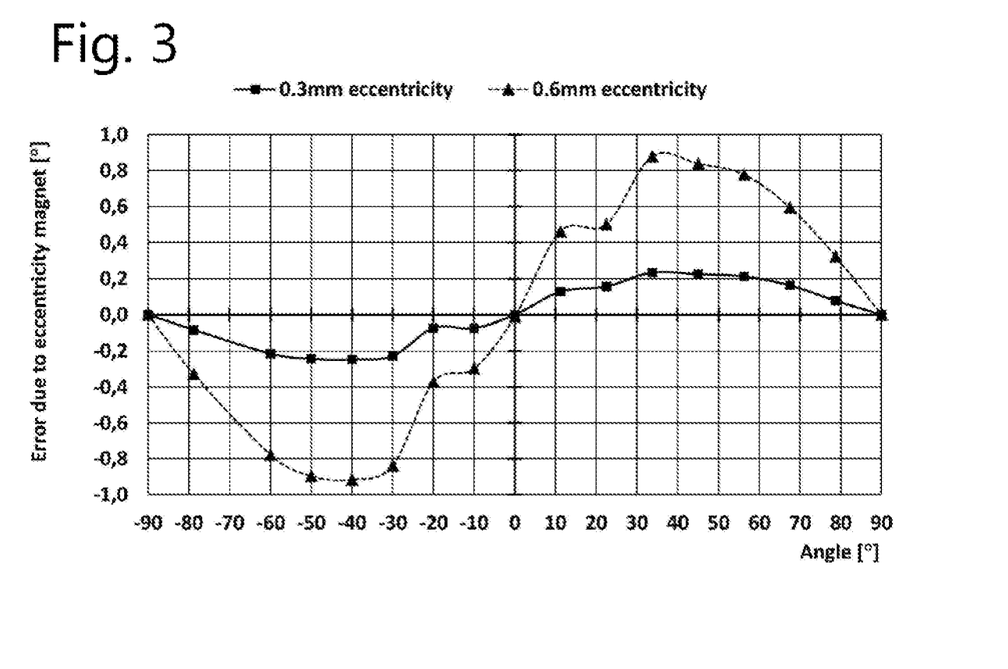
FIG. 3 shows a graph with the error due to eccentricity as a function of the angle.

FIG. 3 shows a graph with two curves with the error due to eccentricity of the magnet on the Y-axis and the angle of the magnetic moment of the magnet on the X-axis. In one curve, the eccentricity is 0.3 mm and in the other curve the eccentricity is 0.6 mm. It could be seen that the absolute error is minimal near the angles −90°, 0°, 90° and maximal around −45° and 45°. During the lifetime of a rotation sensor, in particular an angle sensor of an ELC system, wear of the bearing will be greatest in a certain specific direction caused by the design of the apparatus in which the rotation sensor is used. In practice, this specific direction will normally correspond to the angle which is measured most often by the rotation sensor. Due to this wear, the rotation axis of the dipole magnet has the clearance to displace relative to the centre of the sensing-IC and consequently the di-pole magnet will be rotated eccentric with respect to the centre of the sensing-IC. If the direction of displacement is substantially parallel or perpendicular to the magnetic moment of the dipole magnet, the absolute error in the most often used angle of the sensor will be minimal. Thus, if the displacement, i.e. the direction of most wear, is not parallel or perpendicular to the magnetic moment of the dipole magnet, the measured value of the most often used angle will drift away from the real angle, resulting in an incorrect levelling of the apparatus. The current sensing-ICs do not require that the magnetic moment of the dipole magnet has a predetermined angle with respect to the sensing-IC to calibrate the rotation sensor. As a result of this, the orientation of the magnet on the shaft has not been known. However, according to the present technology, to reduce errors in the output signal due to wear of the bearing of the sensor, the sensor comprises a characteristic which is detectable on the outside of the sensor which indicates the magnetic moment of the dipole magnet. This allows a technician to position a rotary position sensor such in an apparatus that the direction of magnetic moment of the dipole magnet is substantially parallel with or perpendicular to the direction of most expected wear over the lifetime of rotary position sensor.

In an embodiment, the alignment characteristic is at least one of but not limited to: a pattern on the outside of the first structure; a non-axisymmetric part of the outside of the first structure; a hole in the first structure; and/or a protrusion of the first structure. In principle, any characteristic could be used that is detectable on the outside of an assembled rotary position sensor and enables a human or robot to position the first structure with a predetermine angel of rotation in a mounting tool or apparatus.

In an embodiment, the first structure comprises a shaft and the dipole magnet is attached to an end of the shaft. As no electrical connections are needed for a di-pole magnet, this embodiment is advantageous over the embodiment wherein the sensing-unit is attached to an end of a shaft.

In a further embodiment, the first structure further comprises a coupling element which is attached to another end of the shaft. Normally, the shape of the coupling element depends on the application of the rotary position sensor and how to mount the rotary position sensor in an apparatus. By positioning during manufacturing of the sensor for a particular application the di-pole magnet on the end of the shaft at a predetermined angular position with respect to the coupling element, the sensor could be manufactured such that when applying the sensor in said application the direction of magnetic moment of the dipole magnet is directly in-line with or perpendicular to the direction in which the most wear of the bearing is expected.

In a further embodiment, the shaft is press-fitted in the coupling element. This feature allows to use an simple manufacturing process to couple the coupling element and the shaft wherein the angel of rotation of the coupling element relative to the shaft could easily adapted depending on the application of the rotary position sensor to be manufactured.

In a further embodiment, a weld strengthens the connection between the coupling element and the shaft. This is advantageous in case a lever is attached to the coupling element and force parallel to the rotation axis of the first structure are acting on the lever.

In another embodiment, the subject technology is directed to a method of manufacturing a rotary position sensor which comprises a dipole magnet with a direction of magnetic moment which is attached to a first structure, a sensing unit attached to a second structure, the first structure being rotatably coupled to the second structure by means of a bearing structure having a rotation axis. The method includes the steps of providing a first coupling structure comprising an alignment characteristic which is detectable on the outside of the rotary position sensor, and attaching the dipole magnet to the first coupling structure such that the direction of magnetic moment of the dipole magnet is perpendicular to the rotation axis and has a predefined angle of rotation with respect to the radial position of the alignment characteristic on the first coupling structure.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

The advantages, and other features of the technology disclosed herein, will become more readily apparent to those having ordinary skill in the art from the following detailed description of certain preferred embodiments taken in conjunction with the drawings which set forth representative embodiments of the present technology.

Figure 1:
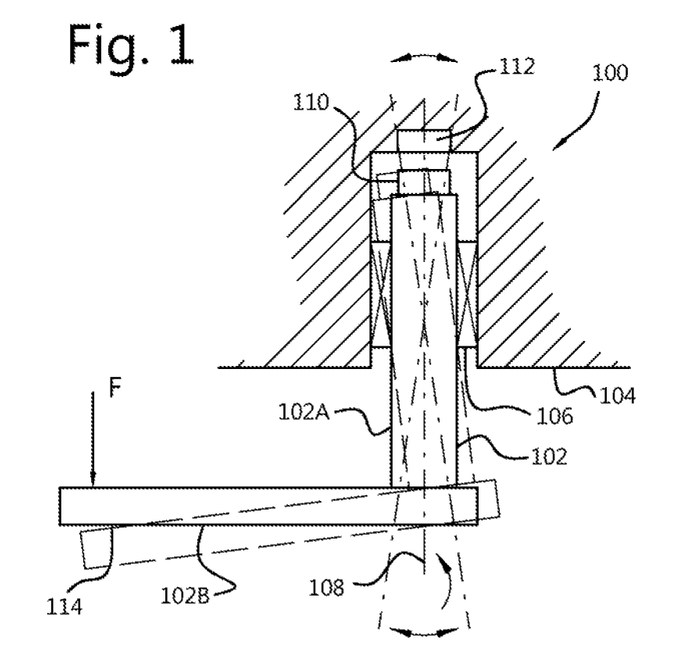
FIG. 1 shows schematically in a sectional view the effect of wear in a rotary position sensor.

FIG. 1 shows schematically in a sectional view the effect of wear in a rotary position sensor. A rotary position sensor 100 is a sensor arrangement comprising a first structure 102 and a second structure 104. The first structure 102 is rotatably coupled to the second structure 104 by means of a bearing structure 106 having a rotation axis 108. The bearing structure may comprise one or more smaller bearings having the same rotation axis. A dipole magnet 110 is attached to the first structure with a direction of magnetic moment perpendicular to the rotation axis 108. A sensing unit 112 is attached to the second structure 104 and configured to measure the absolute angle of direction of magnetic moment of the dipole magnet 110 relative to the orientation of the sensing unit 112. Thus if the first structure 102 rotates X degrees relative to the second structure 104, the angle of direction of the magnetic moment relative to the sensing unit 112 will change accordingly. The sensing unit 112 is an integrated circuit (IC) which measures the absolute position of the magnet's rotation angle and consists of Hall sensors, analog digital converter and digital signal processing. These IC's are known in the art as magnetic rotary position sensors. The IC's are sensitive to the flux density applied orthogonally and parallel to the IC surface.

When applying the rotary position sensor 100 as Electronic Level Control sensor, the second structure 104 is attached to the frame of a vehicle (not shown) and the first structure 102 is coupled to a wheel axis or wheel frame of the vehicle by means of two linkage bars. A vertical linkage bar is positioned more or less vertically and a horizontal linkage is positioned more or less horizontally. An end of the horizontal linkage bar is coupled to the first structure and an end of the vertical linkage is coupled to the wheel axis. The other two end of the linkage bars are coupled by means of a hinge. When a wheel moves upwards relative to the frame of the vehicle, the vertical lever will move in substantially the same direction of the wheel causing the horizontal lever to rotate around the rotation axis of the rotary position sensor. In FIG. 1, the horizontal lever is schematically illustrated by reference number 114.

While a vehicle is driving, the ends of the horizontal and vertical linkage bars coupled together, will move upward/downward but also in a direction substantial parallel to the rotation axis. The linkage bars have a length of about 50 cm and could resonate at a frequency of about 28 Hz in a direction parallel to the rotation axis of the rotation axis of the rotary position sensor. This movement substantial parallel to the rotation axis 108 can be represented as a resonating force F acting on the linkage bars. This force F will result in friction on the bearings and as a result wear appears in the bearing. As a result of wear, the rotation axis of the di-pole magnet 110 could tilt and not be in line with the measuring centre of the sensing unit 112. In that case, the di-pole magnet 110 rotates eccentric with respect to the measuring centre of the flux sensitive area of the sensing unit 112.

It has been found that displacement of the di-pole magnet 110 from the rotation axis 108 through the centre of the sensing unit 110 and perpendicular to the flux sensitive area introduces an error in the value of angle measured by the sensing unit 112. Furthermore, it has been found that this error depends on the angle between the direction of displacement and direction of the magnetic moment of the di-pole magnet 110.

Figure 2A:
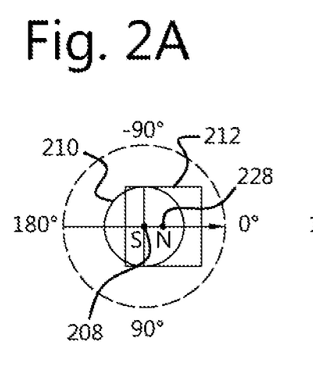
FIGS. 2A, 2B and 2C show schematically three angles of rotations of an eccentric positioned rotary position sensor.
Figure 2B:
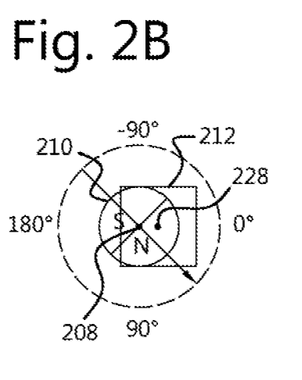
Figure 2C:
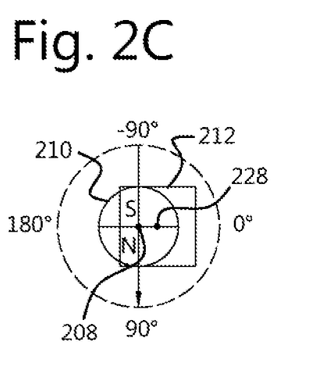

FIG. 2A shows schematically a sensing unit 212 and a di-pole magnet 210. The centre 228 of the sensitive area of the sensing unit 212 and a rotation axis 208 of the di-pole magnet 210 do not coincide. In other words, the centre 228 of the sensing unit 212 and the rotation axis 208 of the di-pole magnet 210 are eccentric and the angle between the direction of displacement and direction of the magnetic moment, indicated with an arrow though the rotation axis 208 is 0°. In FIGS. 2B and 2C the angle between the direction of displacement and direction of the magnetic moment is respectively 45° and 90°.

FIG. 3 shows a graph with the error due to eccentricity as a function of the angle. Two curves are shown. A first curve wherein the eccentricity of or distance between the rotation axis 208 of the di-pole magnet 210 and centre 228 of the flux sensitive area of the sensing unit 212 is 0.3 mm and a second curve wherein the eccentricity is 0.6 mm. The angle corresponds to the angle between the direction of the magnetic moment of the di-pole magnet 210 (indicated with an arrow) and the line through the rotation axis of the magnet 210 and centre 212 of the sensing unit 212. The skilled person would learn from this graph that the error due to eccentricity is 0 when the angle is 0° and 90°. Furthermore, the absolute error is maximal at approximately 45° and increases more than linearly with increase of the eccentricity.

This means that when the direction of the line between the centre 228 of the sensing unit 212 and the rotation axis 208 of the di-pole magnet 210 and the direction of the magnetic moment are parallel or perpendicular, the error in the value of the angle measured by the sensing unit is small, regardless of the eccentricity.

In FIG. 1, the first structure 102 comprises a shaft 102A and a coupling structure 102B. The coupling structure 102B is also a horizontal lever 114. A force F acting on the lever 114 which is parallel to the rotation axis 108 of the shaft 102A will cause friction on the bearing resulting in wear of the bearing and finally to tilt of the rotation axis of the shaft 102A. The rotation axis 108 of the di-pole magnet 110 will move away from the centre of the sensing unit 112 attached to the second structure 104 and the di-pole magnet 110 will rotate eccentric with respect to the centre of the sensing unit 112. It is noted that the direction of the movement is substantially parallel to the direction of the shortest line between the point where the force F is acting on the lever 114 and the rotation axis of the shaft 102A. From FIG. 3, when the direction of magnetic moment of the di-pole magnet 110 is parallel of perpendicular to the direction of movement, the error due to eccentricity is negligible. Thus, with a straight lever, when the di-pole magnet 110 is attached to the first structure 102 such that the direction of magnetic moment is parallel or perpendicular to the lever 114, the error due to eccentricity is minimal.

After manufacturing of the rotary position sensor 100, the di-pole magnet 110 is located inside the rotary position sensor 100. By providing an alignment characteristic on the first structure 102 which is detectable on the outside of the rotary position sensor 100, wherein the dipole magnet 110 is attached to the first structure 102 such that the alignment characteristic and direction of the magnetic moment of the dipole magnet 110 have a defined angle of rotation relation on the first structure 102, a technician or assembly device will be able to apply the rotary position sensor in an apparatus such that the direction of magnetic moment is parallel or perpendicular to the angular direction of expected maximal tilt due to a force acting on the first structure and/or wear of the bearings of the rotary position sensor 100. When a lever 114 is directly or indirectly rigidly coupled to the shaft 102A of the first structure 102, the direction of the shortest line between distal end of the lever 114 and rotation axis of the shaft 102A of the first structure 102 has to be substantially parallel of perpendicular to the direction of the magnetic moment of the di-pole magnet 110. By having the alignment characteristic on the rotary position sensor 100, a person or machine can easily verify whether the distal end of the lever 114 is at the correct angle with respect to the alignment characteristic on the first structure 102.

Figure 4:
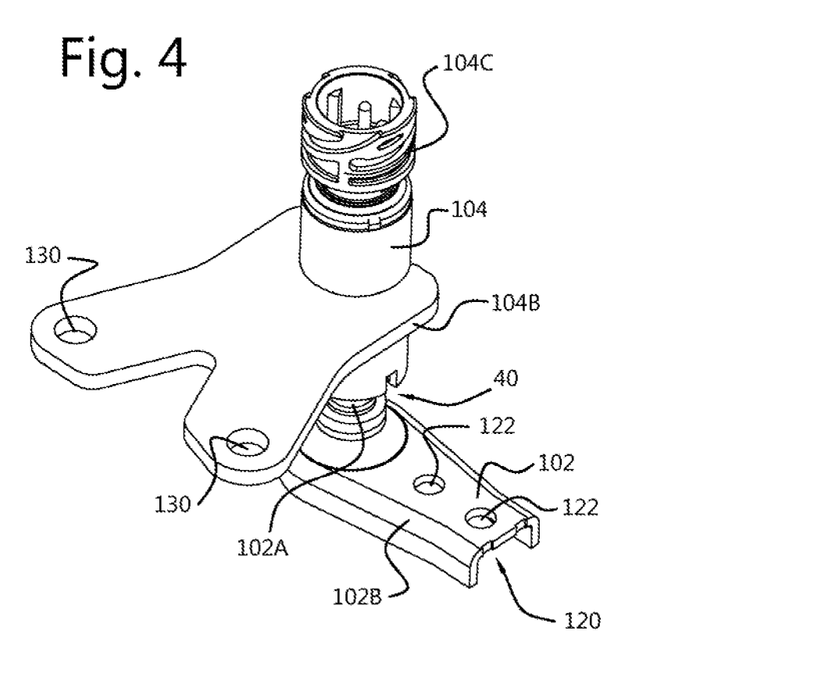
FIG. 4 shows a perspective view of a rotary position sensor.
Figure 5:
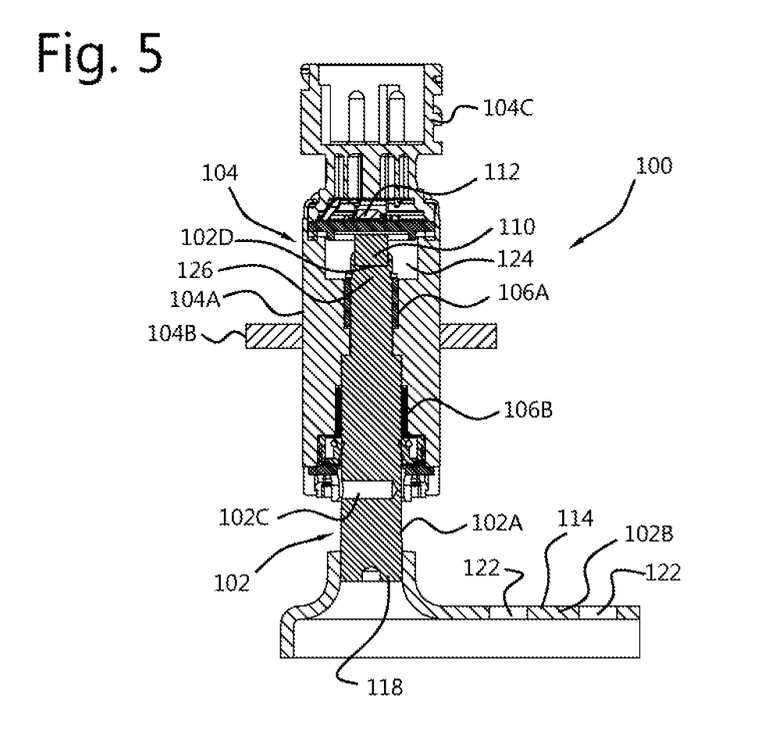
FIG. 5 shows a cross-section of the rotary position sensor shown in FIG. 4.

FIG. 4 shows a perspective view and FIG. 5 shows a cross-sectional view of a rotary position sensor 100 according to the present technology. The rotary position sensor comprises a first structure 102 and a second structure 104. The second structure 104 is preferably made from a metal instead of plastic and forms holes 130 for mounting. The second structure 104 forms a guidance for a bearing structure 106 and a shaft 102A of first structure 102.

In the present embodiment, the bearing structure 106 comprises two bearings 106A, 106B. The bearings 106A, 106B are press fitted in the second structure 104 and are holding the shaft 102A in radial position. By means of the bearing structure 106, the shaft 102A of the first structure 102 can rotate in the second structure 104. The first structure 102 further comprises a coupling structure 102B. The coupling element 102B is configured to attach, for example, a lever (not shown) to the first structure 102. The coupling element 102B forms a channel 120 to receive the lever and mounting holes 122 to fix the lever thereto.

A distal end 118 of the shaft 102A is affixed to the coupling element 102B by press-fitting. In an embodiment, the shaft 102A is a hard metal 17-4PH pin. A di-pole magnet 110 is affixed in a cavity 102D at a proximal end 126 of the shaft 102A. A low cost and robust connection is provided by gluing the di-pole magnet 110 into the cavity 102D. The proximal end 126 of the shaft 102 is positioned in a space 124 formed by the second structure 104.

The second structure 104 comprises a housing part 104A and a coupling part 104B. In an embodiment, the housing part 104A is made of AISI 1018 carbon steel. Other metals could be used. An advantage of AISI 1018 carbon steel is that such steel shields the sensing unit 112 from external magnetic field (1000 Nm) giving an error <0.3% Vs. The coupling part 104B is a metal carrier configured to attach the rotary position sensor 100 to a chassis of an apparatus (not shown). The coupling part 104B is preferably welded to the housing part 104A.

Furthermore, a sensing unit 112 is attached to the housing part 104A of the second structure 104 near the di-pole magnet 110. The sensing unit 112 comprises a sensing IC which measures the absolute position of a magnet's rotation angle. At the beginning of the product life of the rotary position sensor, the sensing unit 112 and di-pole magnet 110 are arranged in the housing part 104A such that the di-pole magnet 110 rotates coaxial with respect to an axis through the centre of and perpendicular to the magnetic flux sensitive area of the sensing unit 112. As explained above, due to wear of the bearing structure 106A, 106B and forces acting on the first structure 102, the rotation axis of the di-pole magnet 110 could move away from the centre of the flux sensitive area of the sensing unit 112. The sensing unit 112 is attached to a printed circuit board (PCB). The PCB is affixed in the housing by mounting a connector part 104C to the housing part 104A. In an embodiment, the connector part 104C is a connector-flex package. In the rotary position sensor 100 shown in FIG. 5, the second structure 104 of the rotary position sensor includes: the housing part 104A, the coupling part 104B, PCB and connector part 104C.

The coupling element 102B is a non-axisymmetric part and orients the di-pole magnet 110 to the first structure 102 such that the direction of the magnetic moment of the dipole magnet 110 has a predefined angle of rotation with respect to the coupling element 102B. The proper orientation may be done by positioning the first structure 102 each time with the coupling element 102B in a specific angular position in a mounting tool. When a component placement machine is configured to pick-up the di-pole magnet 110 with the magnetic moment with a specified angular position and the first structure 102 is positioned with a specified angular position with respect to the component placement machine, the component placement machine is capable of positioning the di-pole magnet 110 with the magnetic moment with a defined angle of rotation relation on the proximal end 126 of the shaft 102A of the first structure 102 with respect to the coupling element 102B. By specifying in the specification sheet of the rotary position sensor 100 the angle of rotation of the magnetic moment with respect to the coupling element 102B of the first structure 102, a person or machine may use the coupling element 102B as alignment characteristic which is detectable on the outside of the rotary position sensor 100. This alignment characteristic allows determining whether the direction of magnetic moment of the di-pole magnet 110 corresponds to the direction in which the maximum movement of the di-pole magnet 110 from the centre of the sensing unit 100 due to wear of the bearings 106A, 106B is expected or is perpendicular to said direction. Alignment characteristics that might be used are, but not limited to: a pattern on the outside of the first structure; a mark; a groove; and/or one or more bores as long as the bores are visible on the outside of the rotary position sensor. A bore 102C in the shaft 102A of the first coupling structure is shown in FIGS. 5 and 6.

Figure 6:
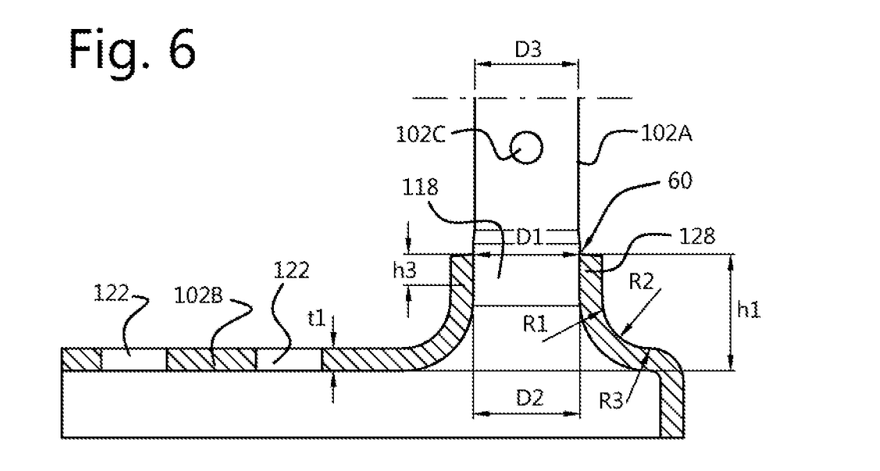
FIG. 6 shows a sectional view of a coupling element of a rotary position sensor.

FIG. 6 shows a cross-sectional view of a coupling element 102B of a rotary position sensor 100 with a side view of the distal end 118 of the shaft 102A inserted therein. The shaft 102A has a varying diameter which increases from the proximal end 126 to the distal end 118. In FIG. 5, it can be seen that the pass throughs of bearings 106A, 106B have different diameters matching the diameter of the shaft 102A. Furthermore, the part of the shaft 102A just above the press-fitting has a diameter D3 and inside the press fitting a diameter D2. The coupling element 102B is made by deep drawing and has a flange 128 with an opening in which the distal end 118 of the shaft 102A is press-fitted. The thickness of the plate to manufacture the coupling element 102B is t1. The opening of the flange 128 has a diameter D1. The diameters have the following relationship D3<D1<D2. In an embodiment, D1=10.25±0.05 mm, D2=10.335+0.03 mm and D3=10.1+0.05 mm. The opening of the flange 128 is tapered. The exterior of the flange 128 has a vertical part with height h3 followed by a tapered part with three radii R1, R2, R3. The exterior of the flange 128 proceeds as a horizontal surface of the first part of the rotary position sensor 100. The three radii R1, R2, R3 are selected such that stresses in the first structure are minimized and the sensor 100 can withstand 15 million cycles of ±10 Nm moment combined with ±45° of rotation. The height h3 is a minimal height to ensure that the shaft 102A is stably positioned perpendicular to the length direction of the coupling element 102B by the press-fitting process. A circular wobbled laser weld may be provided at the location indicated with reference numeral 60 to strengthen the coupling between shaft 102A and coupling element 102B. The lever part of the coupling element 102B comprises holes 122 to attach for example a linkage bar to the coupling element by means of for example a fastener such as a bolt and nut.

Figure 7:
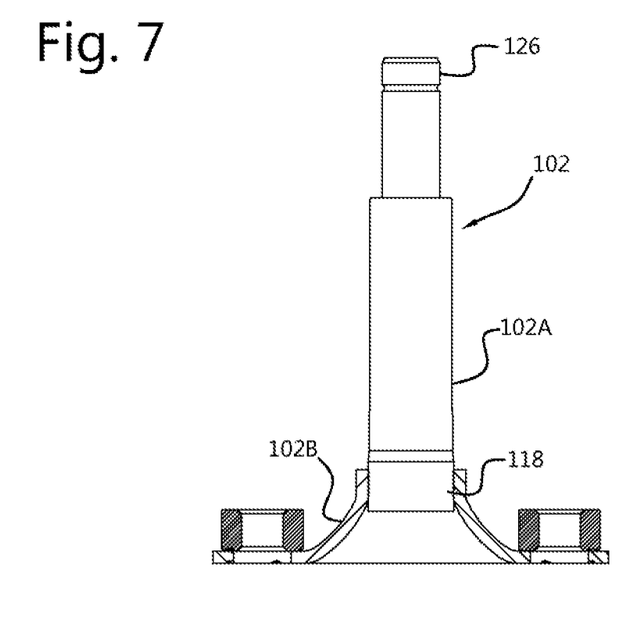
FIG. 7 shows schematically a part sectional view of an embodiment of a first structure.

FIG. 7 shows schematically a partial sectional view of another embodiment of the first structure 102. In this embodiment, the first structure 102 comprises a shaft 102A and a coupling element 102B. The shaft 102A is also press fit in a central opening of the coupling element 102B and preferably further secured by a circular wobbled weld. The coupling element 102B may be formed with a deep drawing process.

Figure 8:
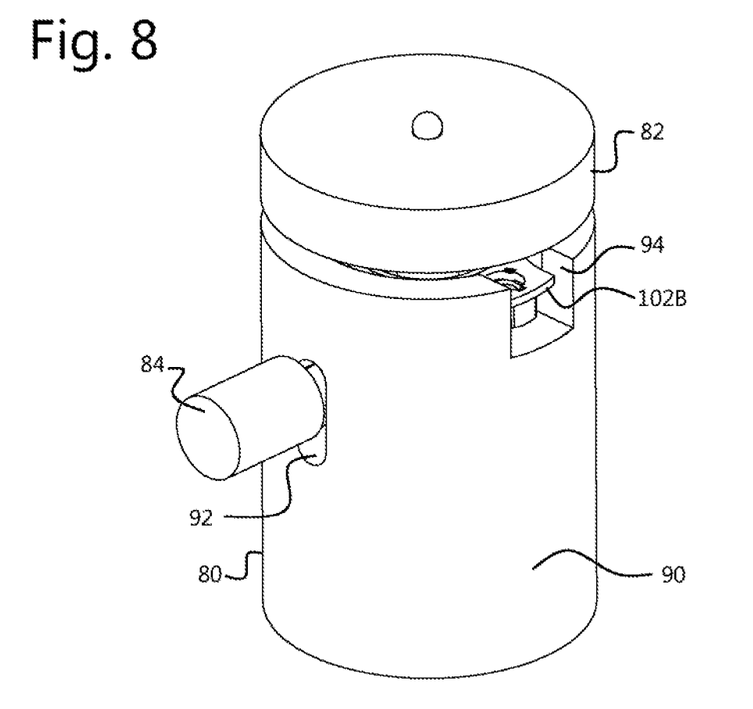
FIG. 8 shows schematically a perspective view of assembly tool parts for press-fitting the shaft in the coupling element.

FIG. 8 shows schematically a perspective view of assembly tool parts 80, 82, 84 for press-fitting the shaft 102A in the coupling element 102B. There are three assembly tool parts with a first assembly tool part 80 being configured to receive the coupling element 102B in a predefined unique position. The first assembly tool part 80 further comprises a central opening with a central axis to receive the shaft 102A and the coupling element 102B. The coupling element 102B rests in a radial notch 94 of the first assembly tool part 80 so that the coupling element 102B is positioned in said predefined unique position. In other words, the coupling element 102B slots into the radial notch 94 to set the rotational position of the coupling element 102B in the first assembly tool part 80. A second assembly tool part 82 is configured to press the shaft 102A in an axial direction of the first assembly tool part 80.

Figure 9:
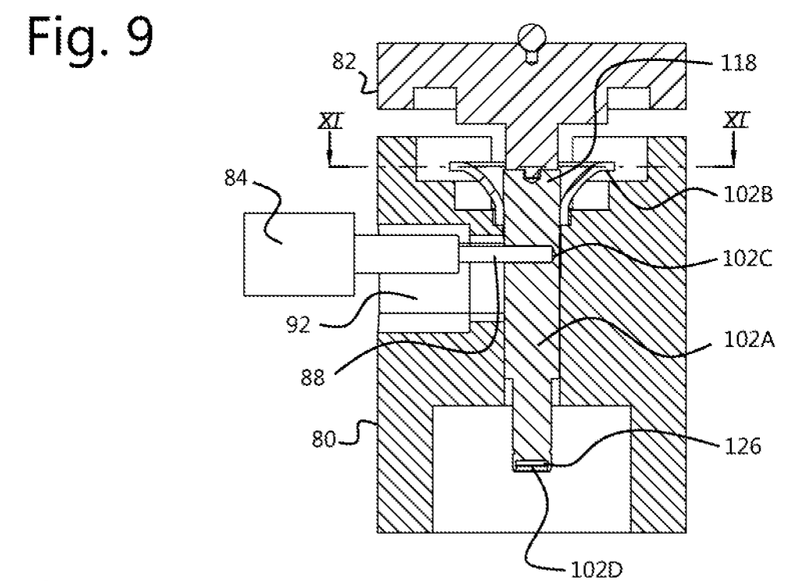
FIG. 9 shows schematically a sectional view of FIG. 8 before press-fitting
Figure 10:
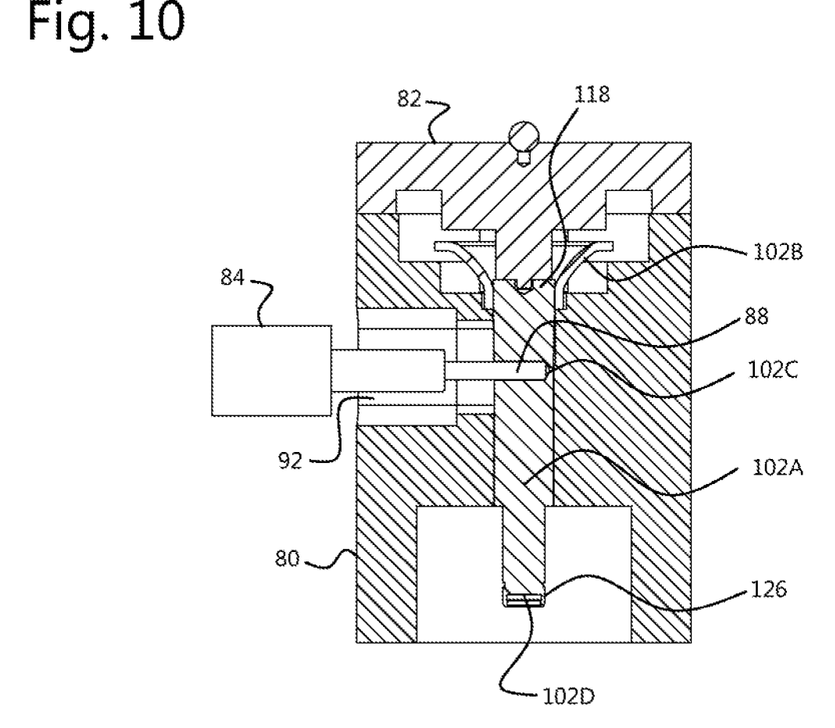
FIG. 10 shows schematically a sectional view of the assembly tool parts after press-fitting; and, FIG. 11 shows schematically a sectional view along the plane XI-XI in FIG. 9.
Figure 11:
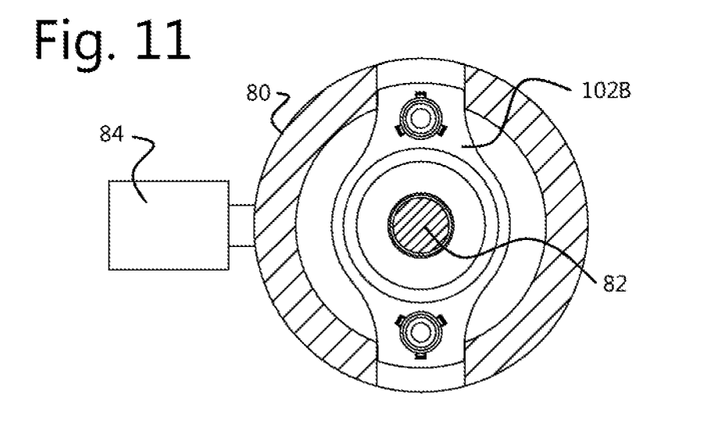

Referring additionally to FIG. 9, optionally, there is provided a third assembly tool part 84. The third assembly tool part 84 is used when the shaft 102A comprises a bore 102C which is perpendicular to the central axis of the shaft 102A. The bore 102C is used as alignment feature during manufacturing of the rotary position sensor 100 and when the bore 102C is visible on the outside of the assembled rotary position sensor 100. The bore 102C can be used to indicate the direction of magnetic moment of the di-pole magnet 110 on the first structure 102. The third assembly tool part 84 comprises a tip 88 which fits in the bore 102C of the shaft 102A. The circular wall 90 of the first assembly tool part 80 forms an elongated opening 92 enabling the tip 88 of the third assembly tool part 84 to be positioned in the hole 102C of the shaft 102A. The elongated opening 92 has a length which is at least the distance the shaft 102A moves along its central axis to press-fit the shaft 102A in the coupling element 102B in its final position. The third assembly tool 84 enables positioning the hole 102C of the shaft 102A at a predefined angle of rotation with respect to the coupling element 102B because the orientation of the radial notch 94 and elongated opening 92 is fixed. FIG. 9 shows schematically a sectional view of the assembly tool parts 80, 82, 84 in FIG. 8 before press-fitting the shaft 102A in the coupling element 102B. FIG. 10 shows schematically a sectional view of the assembly tool parts 80, 82, 84 after press-fitting the shaft 102A in the coupling element 102B. The first and second assembly tools 80, 82 enable one to press-fit the shaft 102A to the coupling element 104B such that the central axis of the opening in the coupling element 102B is aligned with the central axis of the shaft 102A. FIG. 11 shows schematically a sectional view along the plane XI-XI in FIG. 9. One can see that the coupling element 102B is a uniquely positioned in the first assembly tool.

A method of manufacturing a rotary position sensor 100 according to the present technology comprises the following actions: providing the first structure 102 which comprises an alignment characteristic which is detectable on the outside of the rotary position sensor 100; and attaching the dipole magnet 110 to the first coupling structure 102 such that the direction of magnetic moment of the dipole magnet 110 is perpendicular to the rotation axis and has a predefined angle of rotation with respect to the radial positon of the alignment characteristic on the first coupling structure 102.

The attaching action comprises the following sub actions: rotating the first coupling structure such that the bore 102C in the shaft is aligned with an alignment structure 40 of the second structure 104, wherein the alignment structure 40 is a notch (see FIG. 4); inserting a locking pin (not shown) in the alignment characteristic, the alignment characteristic being a bore 102C; positioning the second coupling structure 104 in a predefined position on an assembly tool; a gripping tool (not shown) taking the dipole magnet 110 with a defined direction of magnetic moment and, attaching the dipole magnet to a proximal end 126 of the shaft 102A by movement of the gripping tool to a position with predefined orientation of the gripping tool with respect to the assembly tool such as by visually or mechanically referencing the alignment structure 40.

The locking pin ensures that the first structure 102 has a predefined angle of rotation in the second structure 104. This enables a component placement machine to position the magnet 110 to the first structure 102 at a predefined angle of rotation while the second structure 104 is held in a predefined orientation and position with respect to the component placement machine.

A method to manufacture the first structure 102 comprises the actions: providing a first assembly tool 80 comprising a through hole with a central axis for receiving a shaft part 102A and at one end of the through hole an alignment structure 94 for receiving the coupling element 102B such that the opening of the coupling element 102B is in line with the through hole; providing the coupling element 102B; positioning the coupling element 102B on the alignment structure 94 of the first assembly tool 80; providing the shaft 102A; positioning through the opening of the coupling element 102B and in the through hole a distal end 118 of the shaft part 102A; and, press fitting the distal end 118 of the shaft 102A in the opening of the coupling element 102B by moving the shaft 102A in axial direction by pushing a second assembly tool 82 against the distal end 118 of the shaft part 102A.

Optionally, the method comprises the action of laser welding surfaces of the shaft part 102A and coupling element 102B forming the press fitting together. In an embodiment of the method, the laser welding action comprises moving a laser beam along a wobbled path around the central axis to generate a circular wave-like weld.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope of the appended claims.

The invention claimed is:

1. A rotary position sensor comprising:
a first structure;
a second structure, the first structure being rotatably coupled to the second structure by a bearing having a rotation axis;
a dipole magnet attached to the first structure, the dipole magnet having a direction of magnetic moment;
a sensing unit attached to the second structure, the sensing unit having a centre and configured to measure an absolute position of a rotation angle of the dipole magnet,
wherein the magnetic moment of the dipole magnet has a predetermined angle with respect to the sensing unit, wherein the predetermined angle is configured to minimize error from eccentric rotation; and
a mechanical alignment feature for properly orienting the direction of magnetic moment of the dipole magnet, wherein the mechanical alignment feature is detectable from the outside of the rotary position sensor.

2. The rotary position sensor according to claim 1, wherein the first structure includes a shaft attached to a lever, the lever being substantially parallel to the line.

3. The rotary position sensor according to claim 2, wherein shaft is substantially perpendicular to the lever.

4. The rotary position sensor according to claim 1, wherein the mechanical alignment feature is selected from the group consisting of a pattern on an outside of the first structure, a non-axisymmetric part of the outside of the first structure, a hole in the first structure, and a protrusion of the first structure.

5. The rotary position sensor according to claim 1, wherein the dipole magnet is circular.

6. A rotary position sensor comprising:
a first structure;
a second structure, the first structure being rotatably coupled to the second structure by a bearing having a rotation axis;
a dipole magnet attached to the first structure, the dipole magnet having a direction of magnetic moment; and
a sensing unit attached to the second structure, the sensing unit having a centre and configured to measure an absolute position of a rotation angle of the dipole magnet,
wherein the magnetic moment of the dipole magnet has a predetermined angle with respect to the sensing unit, wherein the predetermined angle is determined by at least a direction of expected wear; and a mechanical alignment feature for properly orienting the direction of magnetic moment of the dipole magnet, wherein the mechanical alignment feature is detectable from the outside of the rotary position sensor.

7. The rotary position sensor according to claim 6, wherein the first structure includes a shaft, wherein the dipole magnet is affixed within a cavity of the shaft.

8. A rotary position sensor comprising:
a first structure and a second structure, the first structure being rotatably coupled to the second structure by means of a bearing having a rotation axis;
a dipole magnet attached to the first structure with a direction of magnetic moment perpendicular to the rotation axis; and
a sensing unit attached to the second structure and configured to measure the absolute position of the dipole magnet's rotation angle,
wherein the first structure comprises mechanical alignment feature which is detectable on the outside of the rotary position sensor, wherein the dipole magnet is attached to the first structure such that the mechanical alignment feature and direction of the magnetic moment of the dipole magnet have a defined angle of rotation relation on the first structure.

9. The rotary position sensor according to claim 8, wherein the mechanical alignment feature is at least one of: a pattern on the outside of the first structure; and a non-axisymmetric part of the outside of the first structure.

10. The rotary position sensor according to claim 8, wherein the first structure comprises a shaft and the dipole magnet is attached to a proximal end of the shaft.

11. The rotary position sensor according to claim 10, wherein the first structure further comprises a coupling element which is attached to a distal end of the shaft.

12. The rotary position sensor according to claim 11, wherein the shaft is press-fitted in the coupling element.

13. The rotary position sensor according to claim 11, wherein a weld strengthens the connection between the coupling element and the shaft.

14. The rotary position sensor according to claim 11, wherein the coupling element is provided with the mechanical alignment feature.

15. The rotary position sensor according to claim 8, wherein the magnetic moment of the dipole magnet has a predetermined angle with respect to the sensing unit.

16. The rotary position sensor according to claim 15, wherein the predetermined angle is configured to minimize error from eccentric rotation.

17. The rotary position sensor according to claim 15, wherein the predetermined angle is determined by at least a direction of expected wear.

* * * * *